(12) United States Patent
Yokohata

(10) Patent No.: US 6,218,051 B1
(45) Date of Patent: Apr. 17, 2001

(54) SEPARATOR MATERIAL FOR SECONDARY LITHIUM BATTERIES

(75) Inventor: Akihito Yokohata, Urawa (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 09/374,389

(22) Filed: Aug. 13, 1999

Related U.S. Application Data

(63) Continuation-in-part of application No. 09/274,368, filed on Mar. 23, 1999, now abandoned.

(30) Foreign Application Priority Data

Nov. 9, 1998 (JP) .................................................. 10-317582

(51) Int. Cl.$^7$ ....................................................... H01M 2/16
(52) U.S. Cl. .......................... 429/249; 524/500; 524/567; 526/253; 526/254; 526/255
(58) Field of Search ..................................... 526/255, 253, 526/254; 429/249; 524/500, 567

(56) References Cited

U.S. PATENT DOCUMENTS

| | | | |
|---|---|---|---|
| 3,765,932 | * 10/1973 | Kokubo | ................................ 117/132 |
| 4,257,791 | * 3/1981 | Wald | ...................................... 55/382 |
| 5,635,039 | * 6/1997 | Cisar | .................................... 204/252 |

FOREIGN PATENT DOCUMENTS

WO 95/06332  3/1995  (WO).
WO 98/34293  8/1998  (WO).

* cited by examiner

*Primary Examiner*—Fred Zitomer
(74) *Attorney, Agent, or Firm*—Flynn, Thiel, Boutell & Tanis, P.C.

(57) ABSTRACT

Separator materials for secondary lithium batteries comprising as the base material a vinylidene fluoride-hexafluoropropylene (VdF-HFP) copolymer resin, wherein polymer particles having a higher softening point than the copolymer are blended and dispersed in the separator. As the polymer particles, fluorinated polymer particles are preferable. The separator materials for secondary lithium batteries are free from short-circuiting during the step of the heat lamination of the separator on electrode membranes.

6 Claims, No Drawings

SEPARATOR MATERIAL FOR SECONDARY LITHIUM BATTERIES

This is a continuation-in-part of U.S. Ser. No. 09/274 368, filed Mar. 23, 1999, abandoned.

BACKGROUND OF THE INVENTION

1. Field of the Invention

This invention relates to separators to be used in secondary lithium batteries.

2. Description of the Prior Art

A secondary lithium battery fundamentally consists of an anode, a cathode and a separator located between these electrodes. This separator contains an electrolyte solution in pores of a separator material, which enables ions liberated from the electrode materials to migrate between the electrodes during the charge/discharge cycle.

Known examples of separator materials for secondary lithium batteries include glass fiber fabrics, microporous polyolefin membranes and non-woven fabrics, and a microporous material obtained by extracting with a solvent a mixture of a vinylidene fluoride-hexafluoropropylene copolymer (hereinafter sometimes referred to as (VdF-HFP) copolymer resin) and a plasticizer so as to eliminate the plasticizer from the mixture and then making the residue microporous as disclosed in National Publication No. 8-509100 of the Japanese Translation of International Publication WO95/06332 (PCT/US94/08772) and National Publication No. 9-500485 of the Japanese Translation of International Publication WO95/15589 (PCT/US94/12641).

Regarding secondary lithium batteries using separator materials of the latter type, such a separator comprises a (VdF-HFP) copolymer resin employed as the base material, silica employed as a filler and dibutyl phthalate employed as a plasticizer. This separator material is inserted between a fluorinated polymer-containing cathode membrane and an anode membrane to give a three-layered laminate. Next, the above plasticizer is extracted with a solvent to thereby form pores having electrolyte sustained therein. Owing to this constitution, the battery can achieve a remarkably elevated ion conductivity compared with conventional secondary lithium batteries of the polymer (solid electrolyte) type. Namely, the battery of this type can give an ion conductivity comparable to those of liquid-type secondary lithium batteries.

When the above-mentioned separator material having a (VdF-HFP) copolymer resin as a base resin is laminated onto the a electrodes, however, there arises a problem of short-circuiting. The present inventor studied factors causative of this short-circuiting and, as a result, estimated that short-circuiting would be induced as follows. In the step of the lamination, the electrode membranes and separator are softened by heating. In practice, not only the interfaces thereof but also the whole electrode membranes and separator are softened. When pressure for adhering the interfaces is applied in this state, active material particles having electrically conductive carbon in the electrode membranes adhering thereto penetrate into the softened separator membrane, thus causing short-circuiting.

SUMMARY OF THE INVENTION

The present invention aims at providing separator materials which are free from short-circuiting even in the process of fabricating batteries, in particular, in the step of the lamination onto electrode membranes.

As the result of intensive studies, the present inventors have found that when polymer particles having a higher softening point than a (VdF-HFP) copolymer resin constituting a separator are dispersed in the separator, these polymer particles serve as a reinforcement to thereby prevent the occurrence of short-circuiting caused by the penetration of active materials contained in electrodes, even when the (VdF-HFP) copolymer is softened. The present invention has been completed on the basis of this finding.

Accordingly, the present invention relates to:

(1) a separator material for secondary lithium batteries comprising as the base material, a vinylidene fluoride-hexafluoropropylene (VdF-HFP) copolymer resin, wherein polymer particles having a higher softening point than the copolymer are blended and dispersed in the separator;

(2) a separator material for secondary lithium batteries as set forth in the above item (1) wherein the polymer particles are fluorinated polymer resin particles; and (3) a separator material for secondary lithium batteries as set forth in the above item (1) wherein the polymer particles are particles of one or more polymers selected from the group consisting of tetrafluoro- ethylene-perfluoroalkyl vinyl ether copolymer resins (PFA), tetrafluoroethylene-hexafluoropropylene copolymer resins (FEP), tetrafluoroethylene-ethylene copolymer resins (ETFE), trifluorochloroethylene-ethylene polymer resins (ECTFE), tetrafluoroethylene polymer resins (PTFE), vinylidene fluoride-hexafluoropropylene copolymer resins (VdF-HFP) and vinylidene fluoride polymer resins (PVdF).

DETAILED DESCRIPTION OF THE PREFERRED EMBODIMENTS

The (VdF-HFP) copolymer resin to be used in the present invention is a copolymer resin of vinylidene fluoride containing 8 to 25% by weight of hexafluoropropylene (HFP) as disclosed in National Publication No. 8-509100 of the Japanese Translation of WO95/06332 and National Publication No. 9-500485 of the Japanese Translation of WO95/15589. The polymer particles to be dispersed in this base material should have a higher softening point than the base resin so that the polymer can remain as particles dispersed in the base resin.

These polymer particles are employed so that the base resin of the separator material is reinforced and prevented from the penetration of active material particles having electrically conductive substances adhering thereto, which exist on the electrode surface in the step of the heat lamination of the separator onto the electrodes, thus preventing short-circuiting.

As these polymer particles, use may be made of those having a higher softening point than the (VdF-HFP) copolymer resin employed as the base resin so that the polymer can remain as particles dispersed in the base resin in the process of producing the separator material and in the step of the lamination for the fabrication of battery units. It is still preferable to use polymer particles having a good adhesiveness to the base resin.

Preferable examples of the material of the polymer particles include fluorinated resins such as vinylidene fluoride polymer resins (PVdF), vinylidene fluoride-hexafluoropropylene copolymer resins (PVdF-HFP), tetrafluoroethylene-perfluoroalkyl vinyl ether copolymer resins (PFA), tetrafluoroethylene-hexafluoropropylene copolymer resins (FEP), tetrafluoroethylene-ethylene copolymer resins (ETFE), trifluorochloroethylene-ethylene copolymer resins (ECTFE) and tetrafluoroethylene polymer resins (PTFE). However, the polymer particles to be used in the present invention are not restricted to fluorinated resins but use can be made therefor of any polymer, so long as it has a higher softening point (for example, not being softened at 120 to 130°°C.), has a good adhesiveness to the base resin and remains stable within the range of the lithium battery operation voltage (4.5 to 2.5 V vs $Li/Li^+$).

The particle diameter of the polymer particles in the base resin ranges from 1 to 100 μm, preferably from 1 to 50 μm and still preferably from 5 to 10 μm, though it varies depending on the membrane thickness of the separator material. Although it is preferable that the polymer particles are superior in solvent resistance to the base resin, regulation may be made by, for example, controlling the time of contact with plasticizers (solvents) in the kneading step of the process for producing the separator material.

In the separator material according to the present invention, it is an essential point that the (VdF-HFP) copolymer base resin contains polymer particles having a higher softening point than the base resin dispersed therein and other related matters are not particularly restricted. That is to say, the separator material may further contain an inorganic filler and a plasticizing solvent (plasticizer).

Examples of the inorganic filler usable in the separator material of the present invention include silica and alumina. As the plasticizer, use may be made of ethylene carbonate, propylene carbonate, dimethoxyethane, diethoxyethane, dimethyl carbonate, diethyl carbonate, dipropyl carbonate, dibutyl phthalate, etc.

Prior to the membrane formation, the base resin, polymer particles, plasticizer and inorganic filler may be mixed preferably at the following proportions. Namely, the resin materials are composed of from 80 to 95% by weight of the base resin and from 5 to 20% by weight of the polymer particles. To 30 to 80% by weight of the resin materials is added 20 to 70% by weight of the plasticizer. To 70 to 90% by weight of the resultant mixture comprising the resin materials and the plasticizer is further added 10 to 30% by weight of the inorganic filler.

The separator material of the present invention can be produced by the processes disclosed in National Publication No. 8-509100 of the Japanese Translation of WO95/06332 and National Publication No. 9-500485 of the Japanese Translation of WO95/15589 as cited above. Namely, the components of the separator material, i.e., the base resin, the polymer particles, the plasticizer and the inorganic filler, each at the proportion as specified above, are mixed with a low-boiling solvent such as THF, acetone, NMP or diethyl ether. Next, a membrane is formed from this slurry mixture containing the polymer particles by casting or coating. In this case, it is an essential point to sustain the polymer particles in the state of particles in the separator membrane by controlling the time of contact with the low-boiling solvent. This can be achieved by, for example, adding the solvent immediately before the termination of the mixing.

After forming the separator material membrane, the plasticizer is extracted off from the separator membrane with the use of the low-boiling solvent described above. Next, the anode and cathode membranes are heat laminated onto the separator material membrane to thereby give a battery cell. Alternatively, the plasticizer may be extracted off after the completion of the heat lamination.

EXAMPLE 100 g of a separator feedstock comprising 25% by weight of a vinylidene fluoride-hexafluoropropylene copolymer resin (m.p.: 140–145° C.; KYNAR2801F mfd. by Elphatochem), 5% by weight of a polyvinylidene fluoride resin (m.p.: 155–160 C.; particle diameter: 5 μm; KYNAR301F mfd. by Elfatochem), 20% by weight of fumed silica and 50% by weight of dibutyl phthalate was mixed with 200 g of acetone employed as a solvent in a ball mill. Then the obtained mixture was applied with a doctor blade in a uniform thickness. After evaporating off the acetone, separator membranes of 30 μm and 40 μm in thickness were obtained. When the surface of each separator membrane was observed, a particulate structure (about 5 μm) of the polyvinylidene fluoride resin was found.

To confirm the properties of these separator membranes, they were heat laminated onto the following cathode and anode to give secondary lithium batteries.

(1) Cathode 100 g of a cathode feedstock comprising $LiMnO_2$/electrically conductive carbon Super P/KYNAR2801/dibutyl phthalate (weight ratio: 56/6/15/23) was mixed with 110 g of acetone employed as a solvent in a blender (4,000 rpm) for 10 min. Then the obtained mixture was applied with a doctor blade in a uniform thickness. After evaporating off the acetone, a cathode membrane of 130 μm in thickness was obtained. An aluminum mesh (50 μm, opening: 70%) employed as a collector was heat laminated on the cathode membrane at about 120° C. to give a cathode.

(2) Anode

Use was made of a mesophase carbon material (MCMB25–28 mfd. by Osaka Gas Co. Ltd.) widely used as an anode material in lithium batteries. 100 g of an anode feedstock comprising MCMB/electrically conductive carbon Super P/KYNAR2801/dibutyl phthalate (weight ratio: 56/3/16/25) was mixed with 200 g of acetone employed as a solvent in a ball mill. Then the obtained mixture was applied with a doctor blade in a uniform thickness. After evaporating off the acetone, an anode membrane of 150 μm in thickness was obtained. A copper mesh having the same shape as that of the aluminum mesh described above was employed as a collector and was heat laminated on the anode membrane at about 120° C. to give an anode.

(3) Fabrication of Battery Cell

On the surface of the anode produced above, each of the above-mentioned separator membranes was heat laminated at about 120° C. Subsequently, the cathode was heat laminated on the separator face in the same manner to give a work. Finally, this work was immersed in ether and, after extracting off the dibutyl phthalate employed as the plasticizer, the work was allowed to absorb an electrolyte (1 M $LiPF_6$ in ethylene carbonate: dimethyl carbonate (1:1) mixture). This work was packed in an airtight bag and sealed while keeping lead wires from the anode and cathode exposed outside the bag, thus giving a battery cell.

COMPARATIVE EXAMPLE

A separator membrane was produced in the same manner as the one of the Example described above, except that the vinylidene fluoride-hexafluoropropylene copolymer resin was used in an amount of 30% by weight without using the polyvinylidene fluoride resin in the separator material. Next, onto this separator membrane, the anode and cathode were heat laminated similarly to the Example described above, thus giving a comparative work, i.e., a conventional product.

The works thus obtained in the above Example and Comparative Example were examined for short-circuiting frequency of by the impedance. The following table shows the results.

|  | Separator film thickness (μm) | | | |
| --- | --- | --- | --- | --- |
|  | 30 | 40 | 50 | 70 |
| Example Short-circuiting frequency (%) | 20 | 5 |  |  |
| Comparative Example Short-circuiting frequency (%) | 95 |  | 30 | 5 |

Note:
Short-circuiting was examined by measuring the impedance |Z| and θ after the completion of the heat lamination, and the case when θ was −30° or above was referred to as normal.

As evident from the short-circuiting frequencies listed above, the separator materials according to the present invention having a (VdF-HFP) copolymer resin base with polymer particles dispersed therein can remarkably inhibit the short-circuiting due to the heat lamination, compared with the conventional ones free from polymer particles. Thus, the separator materials of the present invention can give thinner membranes. When the battery performance was examined with the use of a short-circuiting-free separator, similar battery capacity, rate characteristics and cycle characteristics were achieved regardless of the separator membrane thickness. From the viewpoint of the productivity, therefore, the separator material of the present invention makes it possible to reduce the amount of an expensive electrolyte, thus reducing the cost. From the viewpoint of the qualities of the product, moreover, the separator material of the present invention makes it possible to give a highly reliable lithium battery with reduced thickness.

As discussed above, the present invention makes it possible, by incorporating polymer particles into a separator material comprising a (VdF-HFP) copolymer resin base, to enhance the strength and remarkably inhibit the short-circuiting in the step of the heat lamination onto electrode membranes. Thus, the yield in the fabrication of secondary lithium batteries can be improved. Moreover, the production cost can be reduced and thus highly reliable secondary lithium batteries with reduced thicknesses is can be provided.

What is claimed is:

1. A separator material for secondary lithium batteries comprising as the base material a vinylidene fluoride-hexafluoropropylene (VdF-HFP) copolymer resin, wherein fluorinated polymer particles having a higher softening point than said copolymer are blended and dispersed in said separator, thereby preventing short-circuiting in a step of heat lamination onto electrode membranes.

2. A separator material for secondary lithium batteries as set forth in claim 1, wherein said fluorinated polymer particles are particles of one or more polymers selected from the group consisting of tetrafluoroethylene-perfluoroalkyl vinyl ether copolymer resins (PFA), tetrafluoroethylene-hexafluoropropylene copolymer resins (FFP), tetrafluoroethylene-ethylene copolymer resins (ETFE), trifluorochloroethylene-ethylene polymer resins (ECTFE), tetrafluoroethylene polymer resins (PTFE), vinylidene fluoride-hexafluoropropylene copolymer resins (VdF-HFP), and vinylidene fluoride polymer resins (PVdF).

3. A separator material for secondary lithium batteries as set forth in claim 1, wherein said fluorinated polymer particles are contained in the separator material in an amount of from 5 to 20 wt. %, based on the total weight of the copolymer resin and the fluorinated polymer particles.

4. A separator material for secondary lithium batteries as set forth in claim 1, wherein said fluorinated polymer particles having a softening temperature greater than 130° C.

5. A separator material for secondary lithium batteries as set forth in claim 1, wherein said fluorinated polymer particles have a particle diameter of from 5 to 10 μm.

6. A separator material for secondary lithium batteries as set forth in claim 1, wherein the copolymer resin contains from 8 to 25 wt. % hexafluoropropylene.

* * * * *